May 22, 1934. R. C. WHEELER ET AL Re. 19,179

ALKALINE TREATMENT OF PETROLEUM VAPORS

Original Filed June 24, 1927

Raymond C. Wheeler
Paul W. Prutzman
INVENTORS

Reissued May 22, 1934 Re. 19,179

UNITED STATES PATENT OFFICE 19,179

ALKALINE TREATMENT OF PETROLEUM VAPORS

Raymond C. Wheeler and Paul W. Prutzman, Los Angeles, Calif., assignors to General Petroleum Corporation of California, Los Angeles, Calif., a corporation of Delaware Original No. 1,784,262, dated December 9, 1930, Serial No. 201,259, June 24, 1927. Application for reissue December 6, 1932, Serial No. 645,974

9 Claims. (Cl. 196—36)

Our invention relates to the treatment of petroleum vapors with strong solutions of water-soluble alkalis. It relates also to the treatment of vapors at a high temperature and of vapors intermixed with any proportion of steam.

The object of our invention is to purify various fractions of petroleums containing phenols and naphthenic acids by the conversion of such bodies into salts and soaps, a further object being to withdraw such reaction products from the vapors completely, continuously, and without the production of emulsions or the use of wash-water.

In an application for patent filed by Raymond C. Wheeler on May 31, 1927, Serial No. 195,549, entitled Vapor phase treatment of petroleum, it is disclosed that petroleum distillates, and particularly gasoline and kerosene, may be highly purified by passing the vapors thereof through a permeable bed composed of grains or flakes of solid alkali. It is there further disclosed that this purification resides in the withdrawal from the vapors of various phenols, naphthenic acids and perhaps other bodies, all of which form non-volatile salts with the alkali and may therefore be physically separated from the vapors as a liquid or pasty mass. It is also disclosed in the said application that this process is not applicable to vapors containing material proportions of vapor of water (steam) and is therefore limited to use on such relatively low-boiling oils as can be distilled without the aid of steam.

We have discovered that by treating the vapors with very strong solutions of water-soluble alkalis (such as the carbonates or hydrates of potassium or sodium) in place of the solid alkali, we can effect the same kind and degree of purification on oils of higher boiling point, inasmuch as these solutions may be used to treat vapors containing any proportion of steam.

Before explaining the theory underlying our invention we will illustrate a preferred method of putting it into actual operation.

In the attached drawing, which is diagrammatic and illustrative only

Figure 1:
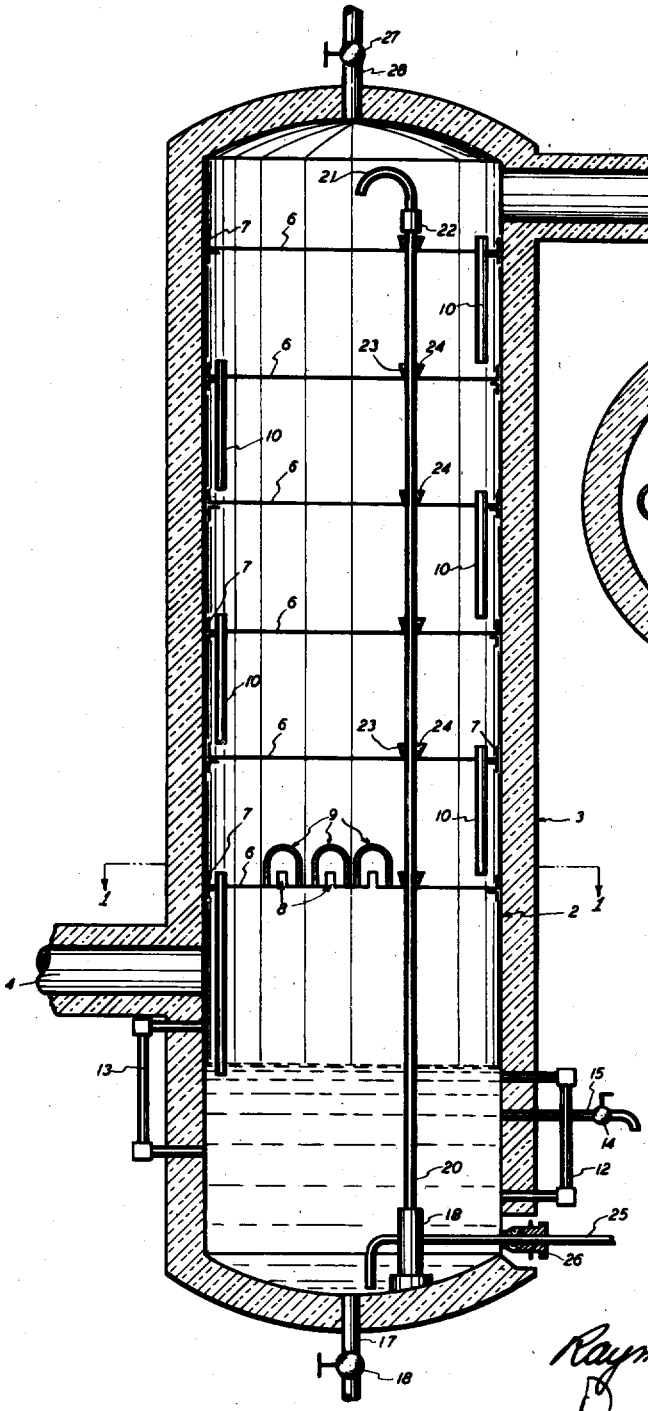
Figure 1 is a vertical section of a simple type of the well known bubble tower, in which the alkaline soluton may be contracted with the vapors.
Figure 2:
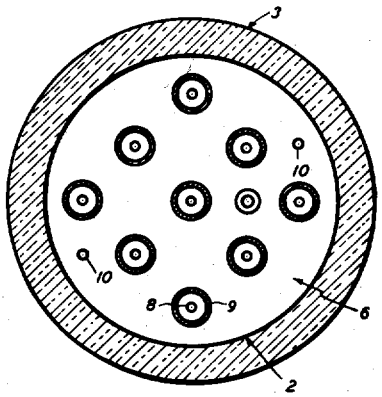
Figure 2 is a plan view of one of the trays in such tower, on the line indicated at 1—1 in Fig. 1.

Referring particularly to Fig. 1, 2 is a steel shell surrounded by a heavy layer of high-temperature insulation, as magnesia-asbestos. 4 is an inlet pipe for oil vapor and 5 a vapor outlet pipe. 6—6 are trays for holding layers of alkali solution, these trays having circumferential flanges 7, vapor jets 8, and bells 9 inverted over the jets and spaced from the bottoms of the trays. These bells may have serrated edges. The tops of the jets must be lower than the upper edges of the flanges, and the bottoms of the bells lower than the tops of the jets. All the trays are alike and are equipped as described, though in the drawing the jets and bells are shown on but a single tray. Fig. 2 shows one of these trays in plan.

The overflow pipes 10, of which there is one for each tray, have their upper ends lower than the upper edge of the flange and higher than the upper ends of the jets of the tray through which they pass. The lower ends of these pipes are lower than the upper end of the similar pipe passing through the tray next below. The overflow pipes are thus sealed against an upflow of vapor, which is thus forced to pass through the jets and, emerging below the rims of the inverted bells, to bubble up through the layer of liquid in the tray. The trays are so supported in the shell as to prevent the upward passage of vapors around them. The downpipe 10′ from the lowermost tray should be long enough to reach below a predetermined liquid level indicated at 11 in the lower part of the shell.

12 is a gauge glass assembly located entirely below the liquid level, for reading the thickness of each of the two layers which will collect in the lower portion of the shell. 13 is a similar assembly placed part below and part above the liquid level indicated at 11, for the purpose of reading and maintaining this level. 14 is a valve and 15 a pipe tapped into the shell 2 intermediate the height of gauge glass 12 and used for drawing off the upper layer of liquid. 16 is a valve and 17 a pipe tapped into the bottom of the shell for drawing off the lower layer of liquid. 18 is a pump having a suction pipe 19 opening into the shell near its bottom and a discharge pipe 20 passing through or around the trays 6 to a point above the topmost tray. This pipe may then turn downward as at 21, and if a collar 22 be inserted below this bend the trays may be slipped over the pipe in assembling. Upward passage of vapors around the pipe may be prevented by providing each tray with a funnel shaped flange 23 to surround the pipe and packing the annular space with asbestos cord as at 24.

The pump may be driven by the shaft 25 passing out of the shell through the stuffing box 26 from a source of power not shown. The valve 27 and the pipe 28 tapped into the upper end of the shell are for introducing an initial or a make-up supply of solution.

Our invention is applied in the operation of the particular apparatus here described in the following manner. The desired oil vapors to be purified are generated in any preferred type of distillation apparatus, not shown, preferably in an apparatus designed for continuous fractionation. The vapors pass from the still into the shell 2 through the vapor pipe 4, at a point below the lowermost tray.

These vapors may comprise any desired fraction of petroleum, may be admixed with any proportion of steam required for assisting the distillation of the petroleum, and may enter the shell at any temperature approximating that at which they emerge from the still.

By means of the pipe 28 a sufficient quantity of an alkaline solution (the nature and strength of which will later be described) is introduced to fill the upper tray and, by overflowing from tray to tray, finally fill the bottom of the shell 2 to the predetermined level 11. The supply of solution is then shut off by closing valve 27 and pump 18 started, the solution being lifted by this pump from the bottom of the shell to the uppermost tray, whence it again flows from tray to tray through the overflow pipes 10 into the bottom of the shell. The solution is thus continuously circulated over the trays and this circulation should be maintained during the continuance of the operation.

It is desirable to preheat the solution, or better the entire apparatus, to the temperature of the oil vapors before any such are admitted, as otherwise the heat required for bringing the apparatus to temperature will be withdrawn from the vapors and much oil thereby condensed. The apparatus should also be so insulated as to stop any avoidable loss of heat by radiation, as condensation of vapors in the treating apparatus is obviously uneconomic, though it has no effect on the progress of the treatment itself.

Vapor temperature having been established in the apparatus and the solution contained therein, vapors entering the shell will pass upward through the jets and under the bells in each successive tray, and will thus be repeatedly scrubbed with the alkaline liquid. During this contact of vapor with liquid the phenols and acids (and perhaps other bodies) contained in the vapors will react with the alkali and, these reaction products being substantially nonvolatile, will be precipitated from the vapors into the alkali. They will not, however, dissolve in the solution, being substantially insoluble in strong alkaline lyes, but will be precipitated as flakes or grains or (if their melting point be sufficiently low) as minute droplets. In either case the precipitate of reaction product will be emulsified in or entrained by the alkaline solution and will be carried with it into the body of liquid maintained in the lower portion of the shell.

In this body, the velocity being highly retarded, the mixture will separate, the reaction products rising to form a slushy or liquid layer which may be withdrawn, at intervals or preferably in a stream, through the pipe 15 and valve 14 to a point of utilization or disposal of naphthenic and phenolic soaps. This product is of value but the manner of purifying and using it is well known and is no part of our present invention.

The alkali solution settling to the bottom of the liquid body is again circulated by the pump, and so on continuously. The quality of the solution is not impaired by use as the reaction products are, as said, not dissolved in it, but the quantity of alkali constantly diminishes, both by entrainment in the reaction products withdrawn and by actual consumption of alkali in forming these products. It will therefore be necessary to introduce make-up lye from time to time or, preferably, in a minute continuous stream, through the pipe 28. The quantity of lye in the apparatus will at all times be shown in the gauge glass 12 and the strength will, for reasons hereinafter given, maintain itself automatically by absorption or evaporation of water.

The vapors having passed the uppermost tray will, if the capacity of the apparatus is not exceeded, be entirely deprived of constituents reactive with alkali and will be thereby highly purified. If the vapors are those of gasoline, for example, the sulfur content will be lowered and all acid bodies will be removed, the product being white and stable in color, sweet in odor and non-corrosive to metals. If the vapors are those of kerosene the burning qualities will be much improved and it is possible to thus manufacture, particularly from asphaltic or naphthenic oils, kerosenes of a quality superior to any which can be made from such crudes by acid treatment, and at a much less cost. If the vapors are those of lubricating distillates the color will be improved, the product will be more amenable to acid treatment, and the danger of forming emulsions in washing after such treatment will be greatly reduced.

After passing the topmost tray the purified vapors leave the shell through pipe 5 by which they are conducted to any preferred form of condenser. If the vapor velocity through the apparatus is high some alkaline solution may be entrained in the vapor current and carried out of the shell. This may be removed, before or after condensation, by any of the well-known means such as baffling or centrifuging the vapors or settling or washing the distillate. A jet or spray condenser may be used to at once condense the vapors and wash out any entrained alkali, or if there is much steam present in the vapor it will absorb the alkali on condensation, leaving the oily condensate substantially neutral. It will be noted that alkali, not soap, is thus entrained, so that water-washing of condensate will not cause the contamination which results from the hydrolysis of soaps by wash-water.

The alkaline solution above referred to may be prepared from any of the water soluble alkalis which strongly retain water. Sodium carbonate dehydrates at too low a temperature to be used for treating vapors of oils having higher boiling points than kerosene. The hydrate and the carbonate of potassium have the requisite affinity for water but are rather costly for commercial use under present conditions. Sodium hydrate or commercial caustic soda has the desired high solubility, is relatively cheap, and we name it as a preferred reagent without limiting our invention to its use.

The alkaline materials above defined as suitable for use in the practice of our invention are the alkaline compounds of the alkali-metals and should not be confused with similar compounds of the alkali-earth-metals, the latter being unsuitable because of their insufficient solubility in water.

The petroleum vapors comprising a definite cut to be treated, as evolved by a continuous distillation means, are intermixed with steam in a proportion which is fixed by the conditions under which the distillation is conducted. So far as the chemical treatment of the vapors is concerned this ratio of steam to oil vapors is not under the control of the operator. Again, the temperature of the vapors is fixed by the boiling points of the fraction, the proportion of steam and other distillation conditions, and is usually at or near the saturation point of the vapors. Thus the temperature also is out of control so far as the treatment is concerned. In other words, the treating apparatus and solution must take care of any temperature and steam percentage at which the vapors may come to the treatment.

A solution of caustic soda circulated in contact with a stream of vapors containing steam will either give off or absorb water until it reaches a concentration at which it has a boiling-point substantially equal to the temperature of the vapor. For instance, if oil vapors (assumed to contain an intermixture of steam) at a temperature of 400° F. were passed through a circulation of caustic solution containing less than 1.0 part water to 3.5 parts caustic, steam would be condensed and absorbed by the caustic until this ratio of water to caustic (being the ratio having a boiling-point of 400° F.) were reached, after which the concentration would not change so long as the temperature remained constant. Conversely, if the solution were originally weaker than as indicated it would lose water until it reached a concentration stable at such temperature.

For this reason the strength of the solution originally fed to the treater is immaterial except as regards convenience. Vapors from commercial distillations of petroleum almost always contain a large excess of steam over the quantity required to dilute a too strong solution, and a weak solution will rapidly concentrate itself to a point of stability at the temperature of the vapors. Such concentration, however, is produced solely by heat withdrawn from the vapors, and as such withdrawal causes a corresponding condensation of oil in the treater (which is undesirable) we prefer to feed a solution having a concentration at least roughly corresponding in boiling point to the vapor temperature. Such concentrations would be about as shown in the following table:

| Temperature | Water | Caustic |
|---|---|---|
| 250° F. | 1.0 | 0.5 |
| 300° F. | 1.0 | 1.2 |
| 350° F. | 1.0 | 2.1 |
| 400° F. | 1.0 | 3.8 |
| 450° F. | 1.0 | 6.4 |
| 500° F. | 1.0 | 13.3 |
| 550° F. | 1.0 | 35.0 |
| 600° F. and above, no water. | | |

While these mixtures are spoken of as solutions the higher concentrations are solid at normal temperatures and as used are more correctly designated as fusions of alkali containing a proportion of water which is variable with the operating temperature.

Because of this tendency to solidify an important precaution when shutting down and cooling the apparatus is to reduce the temperature by injection of wet steam, adding water if necessary, and to continue circulating until all fused caustic is washed out of the trays. This dilute solution may then be withdrawn and concentrated in readiness for another period of operation.

While we have described only one form of apparatus suitable for contacting vapors with alkali in the practice of our invention, it will be understood that the apparatus proposed is no part of our invention and that we are not limited thereto. Our invention lies in the scrubbing or contacting of oil vapors with alkali solutions or fusions, for the removal of bodies reactive with alkali, under conditions which permit the separation of the reaction product from both the vapor and the alkali, whereby the vapor is purified, the reaction products are obtained in a concentrated form without the necessity of bringing them into solution in water, and the alkali is usefully consumed without becoming contaminated with reaction products or the necessity of any revivification. This operation may be actually carried out in any of the well known types of apparatus for contacting liquids with vapors or gases.

We claim as our invention:

1. The continuous method of purifying petroleum vapors which consists in contacting a mixture of said vapors and steam with a solution of sodium hydrate, without substantial condensation of said petroleum vapors, thereby producing a reaction product substantially insoluble in said solution; maintaining a body of said solution in continuous contact with said vapor mixture and at such concentration as to neither evolve nor absorb a material quantity of steam during said contact; continuously contacting said solution with said vapors by cyclic counterflow, and withdrawing said reaction product from said body of solution without discontinuing said contact.

2. The continuous method of purifying petroleum vapors which consists in circulating through a flow stream of said vapors intermixed with steam a stream of sodium hydrate solution, the last said stream being continuously withdrawn from a body of said solution, contacted with said vapors and returned to said body, said body and last said stream being maintained at substantially the original temperature of said vapors and at such concentration as to neither evolve nor absorb a material quantity of steam.

3. The continuous method of purifying petroleum vapors which consists in producing an upwardly moving flow stream of said vapors intermixed with steam; producing a downwardly moving subdivided flow of a solution of sodium hydrate in countercurrent contact with said vapor stream, said hydrate flow being continuously withdrawn from a body of said hydrate maintained in contact with said vapor and returned to said body after said contact with said vapor stream; maintaining both flows at substantially the original temperature of said vapor-steam mixture, and maintaining said solution at such concentration as to neither evolve nor absorb a material quantity of steam.

4. The continuous method of purifying petroleum vapors which consists in contacting a flow stream of said vapors intermixed with steam at substantially the temperature of distillation with a counterflow of fused, commercially pure sodium hydrate containing water, said hydrate being maintained at substantially the temperature of said vapors and being continuously withdrawn from a body of said hydrate, contacted with said vapor and returned to said body, said hydrate fusion being maintained at such concentration as to neither evolve nor absorb a material quantity of steam.

5. Apparatus for purifying petroleum vapors by intimate contact with liquefied alkali, comprising; a vertical shell; retarding means for vapors and liquids arranged therein; a chamber forming a downward extension of said shell and for retaining said liquefied alkali below said retarding means; an inlet for vapor below said retarding means; an outlet for vapor above said retarding means; a pump, together with a conduit located within said shell and arranged to withdraw said alkali from said chamber and discharge it above said retarding means; means communicating with the upper part of said chamber for withdrawing a liquid reaction product from above said alkali in said chamber, and means for introducing fresh alkali into said shell.

6. The continuous method of purifying petroleum vapors which consists in contacting a mixture of said vapors and steam with an aqueous solution of a hydrate of a monovalent alkali-metal without substantial condensation of said petroleum vapors, thereby producing a reaction product substantially insoluble in said solution; maintaining a body of said solution in continuous contact with said vapor mixture and at such concentration as to neither evolve nor absorb a material quantity of steam during said contact; continuously contacting said solution with said vapors by cyclic counterflow, and withdrawing said reaction product from said body of solution without discontinuing said contact.

7. The continuous method of purifying petroleum vapors which consists in circulating through a flow stream of said vapors intermixed with steam a stream of an aqueous solution of a hydrate of a monovalent alkali-metal, the last said stream being continuously withdrawn from a body of said solution, contacted with said vapors and returned to said body, said body and last said stream being maintained at substantially the original temperature of said vapors and at such concentration as to neither evolve nor absorb a material quantity of steam.

8. The continuous method of purifying petroleum vapors which consists in producing an upwardly moving flow stream of said vapors intermixed with steam; producing a downwardly moving subdivided flow of an aqueous solution of a hydrate of a monovalent alkali-metal in countercurrent contact with said vapor stream, said solution flow being continuously withdrawn from a body of said solution maintained in contact with said vapor and returned to said body after said contact with said vapor stream; maintaining both flows at substantially the original temperature of said vapor-stream mixture, and maintaining said solution at such concentration as to neither evolve nor absorb a material quantity of steam.

9. The continuous method of purifying petroleum vapors which consists in contacting a flow stream of said vapors intermixed with steam at substantially the temperature of distillation with a counterflow of fused, commercially pure hydrate of a monovalent alkali-metal containing water, said hydrate being maintained at substantially the temperature of said vapors and being continuously withdrawn from a body of said hydrate, contacted with said vapor and returned to said body, said hydrate fusion being maintained at such concentration as to neither evolve nor absorb a material quantity of steam.

RAYMOND C. WHEELER.
PAUL W. PRUTZMAN.